June 7, 1927.

C. E. ATWOOD

GROUND BRAKE

Filed April 2, 1926

1,631,115

INVENTOR
Charles E. Atwood
BY
F. N. Gilbert
ATTORNEY

Patented June 7, 1927.

1,631,115

UNITED STATES PATENT OFFICE.

CHARLES E. ATWOOD, OF BINGHAMTON, NEW YORK.

GROUND BRAKE.

Application filed April 2, 1926. Serial No. 99,241.

Figure 1:
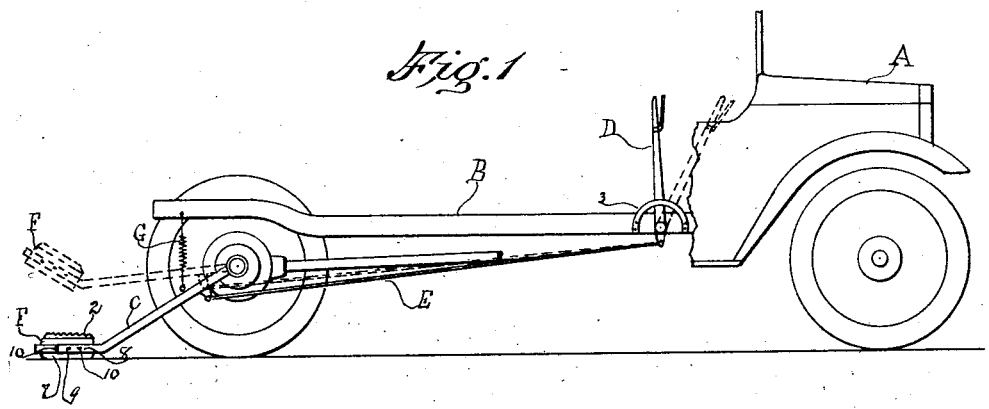
Figure 2:
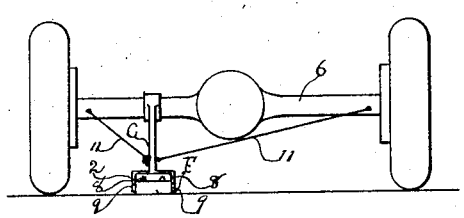
Figure 3:
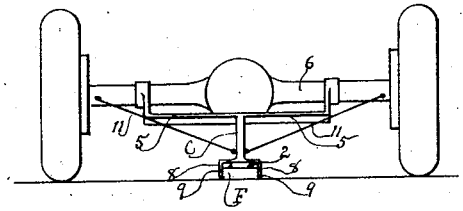
Figure 4:
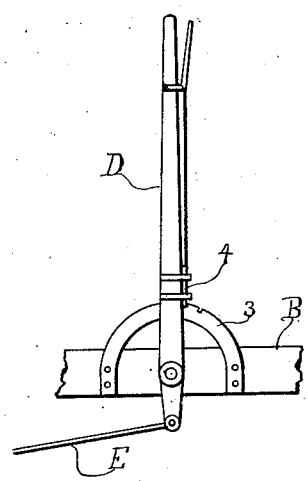
Figure 5:
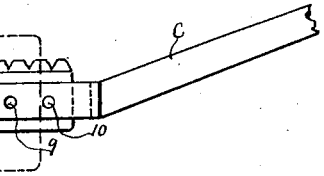
Figure 6:
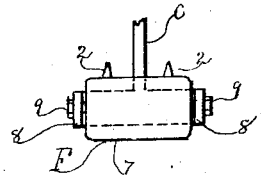

My device has reference to combination ground brakes and anti-skid devices for vehicles whether automobiles or otherwise, and to use a ground engaging member as a safety device to hold the vehicle from movement in case of defective brakes or any other emergency, and also to prevent skidding on slippery places and ice in the same way. The object of my invention is to provide a simple and efficient means for both purposes; it may be easily incorporated in the running gear or applied as an attachment. A special object is to provide a simple and inexpensive device which may be readily applied to automobiles of ordinary construction and convenient to operate and efficient for use, and also to make the cost of production comparatively inexpensive; with these objects in view, my invention consists in certain novel features of construction and arrangement of parts as will be hereinafter fully described and pointed out in the claims. Reference being had to the accompanying drawings in which:

Fig. 1, is a side elevation of my device.
Fig. 2, is an end elevation of my device.
Fig. 3, is an end elevation of my device.
Fig. 4, is a side elevation of a part of my device.
Fig. 5, is a side elevation of fragmentary part of my device.
Fig. 6, is an end view of fragmentary part of my device.

The same reference characters denote like parts in each of the several figures of the drawings.

In carrying out my invention, I have the automobile body A having the frame body B constructed and mounted in the usual manner and the applicant elects to so modify the device as to be mounted upon automobiles, vehicle bodies, and frame works of different kinds, sizes and shapes, and pivotally mounted.

As a further part of my device I have pivotally mounted upon the rear axle, the brake rod C, which may be pivotedly mounted, in one form of my invention in any convenient position upon said rear axle.

As another part of my device, I have pivotally mounted on the frame work of the automobile at the front axle or in any convenient position near thereto, a lever rod D; pivotedly mounted on the lever rod D at one end and pivotedly mounted upon the rod C, at the other end, I have the connecting rod E, the pivotal connection at either end of E, being of any desired form.

As a further part of my device at the lower and outer end of the pivoted rod C, I have mounted in any convenient manner a shoe F, which shoe may be mounted on the rod C or either pivotally or adjustably, or in any other convenient manner, the said side 7 of said shoe F being of a curved surface adapted to come in contact with the surface of the ground, road, or other way.

The outer end of rod C projects into the forked lugs 8. 8, spaced apart.

As a further part of my device said shoe F may be adjustably and pivotally mounted on the rod C, so as to be inverted, and on the opposite side to the curved side I elect to have blades 2. 2, so that the shoe E being inverted can present a cutting surface on the lower side in the ground surface.

The shoe F, is pivotally mounted between the projecting lugs 8. 8, of the rod C, pivoted on the pivot or bolt 9, removably mounted through the lugs 8. 8, and shoe F. To hold shoe F in a lock position on the pivot 9, adapted also to be unlocked, I have removably mounted through the lugs 8. 8, and shoe F, the bolts 10. 10.

This reversability may be accomplished in any convenient manner so that the shoe F may be easily and conveniently changed in its position so as to present an opposite side for using.

As a further part of my device connected with the rod C and mounted in any convenient place upon the under side of the frame of the car body, I have a coil or other convenient spring G, connecting between the car body and the rod C which in its normal operation will hold the rod C, and the shoe F out of contact with the ground.

As a further part of my device in connection with the lever D, I have ratchet 3 and dog 4 mounted on the side of the lever D for the purpose of adjusting and holding the lever in varied position in the operation of the device.

As a further part of my device I elect to construct the rod C having two projecting arms 5. 5 as shown in Fig. 3, the ends of which will be pivotally mounted in any convenient manner upon the rear axle 6 of the car A, while at the outer end of the rod C beyond the projecting arms, I have mounted said shoe F; in this manner the shoe in its pivoted operation may be positioned in the center of the rear axle 6.

As a further part of my device I have the covered chains 11, 11 between rod C and axle 6, one end of the chain 11 mounted on rod C, and the other end of the chain mounted on axle 6, in any convenient manner.

In the operation of my device, the ground shoe being left in its normal position out of contact with the ground, when I desire to apply the ground brake I take hold of the lever D releasing the ratchet, the dog 4 on the lever, and pull back on the rod D which connects with the rod E which distends the spring G and presses down the rod E, and shoe F and forms contact with the ground. It is noted that the shoe F is curved at either end so that when in contact with the ground, a backward or forward movement may be made of the car, and the shoe slide over obstacles. When I desire to remove the ground brake from the ground I release my hold on the lever D, and the spring G, automatically draws up the rod C and with it the shoe F out of contact with the ground. When I desire to use the shoe F as an anti-skidding device, I reverse the position of the shoe and change the face thereof, throwing the projections thereof downward, and the ground shoe face upward, and by the operation of the lever D, as before described, I apply the device, when I am on a slippery surface and desire to prevent skidding from any position, I pull back on lever D which brings the reverse shoe in contact with the ground surface, and causes it to be locked and held in that position by the operation of the dog 4 and ratchet 3. When I desire to release the skidding contact I release the dog 4 from the ratchet and spring G will draw up the shoe from the contact with the surface of the ground. I elect to change and modify the details of construction of my device in any convenient manner without departing from the spirit of my invention. Having thus described my invention what I claim as new and for which I desire Letters Patent is as follows:

1. In a combination with a vehicle, a bar having its inner end pivotally connected with the rear axle, resilient means for holding the outer end of the bar and shoes mounted therein normally off of the ground, a removable and reversable shoe mounted on the end of the bar for contact with the ground, means for adjustably applying the shoe to the ground surface by causing the same to contact with the ground with varied fixed degrees of pressure.

2. In combination with a vehicle a bar having its inner end pivotally mounted on the rear axle, resilient means connecting between the bar, and the body of the car, for holding the shoe normally off of the ground, a removable pivotal double face shoe mounted in the end of the bar for contact with the ground surface, means for applying either face of the shoe to contact with the ground by causing said face to be held in a fixed position of contact with the ground, and with varied degrees of pressure, and means for holding either surface of the shoe in such contact.

3. In combination with a vehicle, a body and a housing for the rear axle, of rings mounted on the said housing, a bar connecting with said rings, the bar provided at its lower end with an interchangeable reversable shoe having opposite surfaces, one surface smooth, and the opposite surface having projections extending therefrom, means mounted on the body and connected with the bar for holding said shoe out of contact with the ground, a pivoted brake lever in front of the driver of the vehicle, and adjustable means for controlling the backward and forward movement of the lever to fixed positions, and a rod pivotally connected with a brake lever at one end and with the bar at the other end and means for holding the shoe spaced at varied fixed distances between the body of the car and the ground, and in contact with the ground surface, with varied fixed degrees of pressure.

In testimony whereof I have affixed my signature.

CHARLES E. ATWOOD.